United States Patent [19]
Ujita et al.

[11] Patent Number: 5,605,301
[45] Date of Patent: Feb. 25, 1997

[54] COIL WINDING METHOD AND APPARATUS THEREFOR

[75] Inventors: Minoru Ujita, Saitama; Masataka Nakajin, Kanagawa; Masao Ishihara, Tokyo, all of Japan

[73] Assignee: Sony Corporation, Japan

[21] Appl. No.: 262,021

[22] Filed: Jun. 17, 1994

[30]  Foreign Application Priority Data

Jun. 21, 1993 [JP] Japan ............................ 5-173714

[51] Int. Cl.$^6$ .................................................. H01F 41/06
[52] U.S. Cl. ...................... 242/447; 242/437.2; 156/446; 140/92.2
[58] Field of Search .................... 242/7.03, 7.04, 242/7.15, 613.1, 613.2; 140/92.2; 156/379.8, 446

[56]  References Cited

U.S. PATENT DOCUMENTS

| | | | |
|---|---|---|---|
| 1,986,094 | 1/1935 | Allan | 140/92.2 |
| 2,388,598 | 11/1945 | Cahill | 242/7.03 |
| 2,479,391 | 8/1949 | Miller | 140/92.2 |
| 2,559,824 | 7/1951 | Leland | 242/7.03 |
| 2,930,014 | 3/1960 | Van der Hoek et al. | 140/92.2 |
| 3,741,262 | 6/1973 | Bell et al. | 140/92.2 |
| 4,484,712 | 11/1984 | Leenders | 140/92.2 |
| 4,496,927 | 1/1985 | Inoue | 336/208 |
| 4,639,457 | 1/1987 | Ishii et al. | 242/7.03 |
| 4,668,544 | 5/1987 | Takahashi | 242/7.03 |
| 5,209,414 | 5/1993 | Clemens et al. | 242/25 |

FOREIGN PATENT DOCUMENTS

| | | |
|---|---|---|
| 256533 | 2/1913 | Germany . |
| 1564485 | 10/1973 | Germany . |
| 2106329 | 4/1983 | United Kingdom . |

OTHER PUBLICATIONS

EPO Search Report.
Patent Abstracts of Japan, JP3155354, Mar. 7, 1991, Masao, et al.
Patent Abstracts of Japan. JP5109571, Mar. 4, 1993, Hajime.

*Primary Examiner*—Katherine Matecki
*Attorney, Agent, or Firm*—Ronald P. Kananen

[57]  ABSTRACT

A coil winding jig comprises: a first block having a first flange to which the free end of the wire is fixed; a second block having a second flange and disposed opposite to and coaxially with the first block with the front surface of the second flange facing the front surface of the first flange and spaced apart a distance corresponding to the width of the coil to be formed from the front surface of the first flange; a third block disposed coaxially with the second block, having a middle portion contained within the second block, and a coil form having a front end to be pressed against the first flange and projecting from the middle portion through a hole formed in the second flange toward the first flange of the first block. The coil form is tapered toward the first flange, has an outer circumference consisting of inclined side surfaces and is provided with steps having a size smaller than half the diameter of the wire on its side surfaces contiguously with the front surface of the second flange.

12 Claims, 4 Drawing Sheets

FIG. I
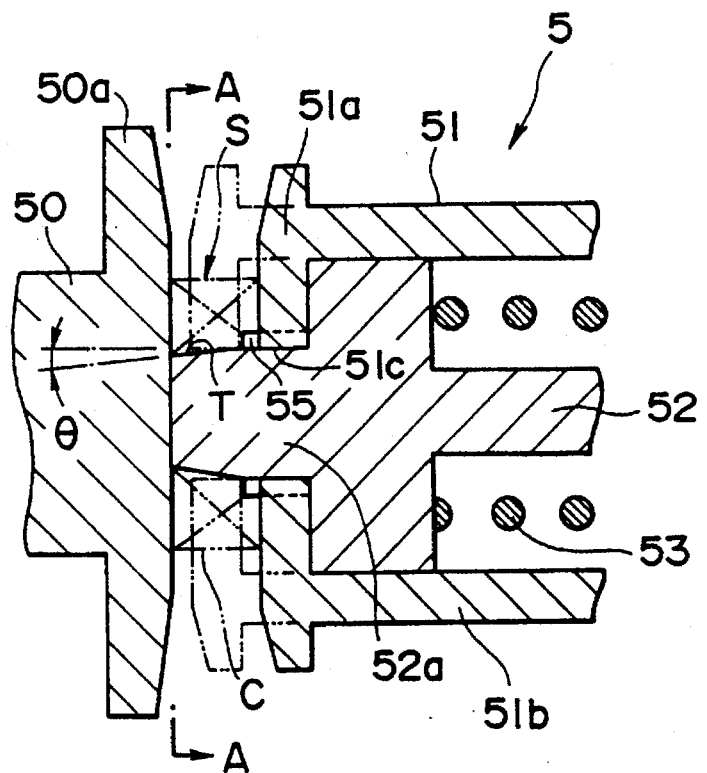
FIG. 2
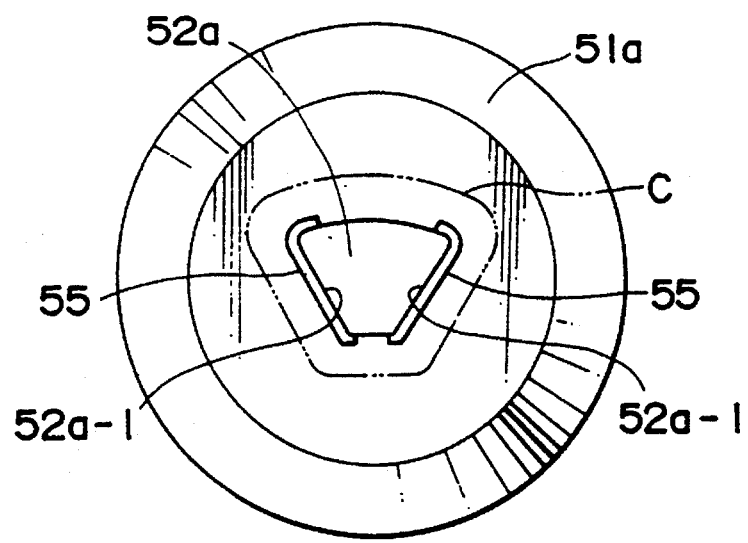

5,605,301

COIL WINDING METHOD AND APPARATUS THEREFOR

BACKGROUND OF THE INVENTION

The present invention relates to a method of forming a coil and a coil winding apparatus for carrying out the coil winding method.

When forming a coil having a polygonal cross section, i.e., a so-called Vicks coil, by winding a wire, for example, for a flat motor, a coil winding jig holding a coil form between a pair of flanges must be rotated while a first layer, a second layer, . . . and n-th layer are sequentially wound onto the form. The spirals of the wire in the second layer and the following layers must be formed between the spirals of a wire in the underlying layer in a mutually interposed arrangement to form each layer.

Since a fixed tensile force is exerted on the wire when winding the wire into the coil, the first spiral of the second layer is forced to fall between the last spiral of the first layer underlying the second layer and a flange of the machine and, consequently, the spirals of the second layer tend not to be formed regularly in a mutually interposed arrangement over the first layer. This results in an irregular arrangement of spirals of the wire in the third layer and the following layers, so that a random coil is formed.

Further, since a tensile force is exerted on the wire when the wire is wound on the coil form, the coil binds onto the coil form with the result that a large force must be applied to the coil to remove the coil from the coil form.

SUMMARY OF THE INVENTION

The present invention has been proposed in view of such problems in the conventional coil winding method and it is therefore an object of the present invention to provide a coil winding method and apparatus capable of forming spirals of a wire in a regular arrangement in each of a plurality of layers and of enabling a coil formed on a coil form to be easily removed from the coil form.

With the foregoing object in view, the present invention provides a coil winding jig to be rotated to form a coil thereon, comprising: a first flange to which one end of a wire is fixed so that the wire exerts a fixed tension thereon; a coil form having one end pressed against the first flange; and a second flange disposed on the coil form at a distance corresponding to a coil forming width from the first flange so as to surround the outer end of the coil form; characterized in that steps are formed near the base end of the coil form.

Preferably, the coil form is tapered toward the first flange and the outer surface of the coil form consists of inclined side surfaces.

Preferably, the coil form and the second flange are movable relative to each other.

Preferably, the coil to be formed on the coil winding jig is a coil having a polygonal cross-section for a flat motor, and the steps are formed on the opposite inclined side surfaces of the coil form and around the opposite edges of the inclined side surfaces.

The present invention further provides a coil winding machine comprising: a coil winding jig comprising a first flange to which one end of a wire is fixed, a coil form having one end pressed against the first flange, and a second flange disposed on the coil form at a distance corresponding to a coil forming width from the first flange so as to surround the outer end of the coil form; a driving source for moving the first flange toward and away from the coil form and for rotating the first flange; a torque transmitting means for transmitting the torque of the first flange to the coil form and the second flange; and a tension means for exerting a tensile force on the wire and feeding the wire to the coil form; characterized in that the coil form is provided near its base end with steps of a size smaller than that of the wire.

Preferably, the coil form is tapered toward the first flange, and the outer surface of the coil form consists of inclined side surfaces.

The present invention provides also a coil winding method comprising: rotating a coil winding jig comprising a first flange, a second flange and a coil form extended between the first and second flanges; and feeding a wire to the coil form while the coil winding jig is rotated to form a coil on the coil form; characterized in that, after forming spirals of the wire in the first layer from the side of the first flange toward the side of the second flange, the first spiral of the second layer is wound on steps formed on the second flange contiguously with the outer surface of the coil form.

The spirals of the first layer are formed on the coil form from the side of the first flange toward the second flange, and then the spirals of the second layer are formed between the adjacent spirals of the first layer from the side of the second flange toward the side of the first flange. Since the first spiral of the second layer is wound around the steps, the first spiral of the second layer is not forced to fall between the last spiral of the first layer and the second flange to form the spirals of the second layer and the following layers in an irregular arrangement, so that a random coil will not be formed. Since the first spiral of the second layer is formed in a correct spiral, the second spiral and the following spirals of the second layer can be regularly formed between the adjacent spirals of the underlying first layer.

Since the coil form is tapered toward the first flange and the surface of the coil form consists of the inclined side surfaces, the spirals of the first layer wound around the coil form tend to move toward the first flange and hence the spirals of the first layer are formed contiguously with each other in an accurate arrangement. Accordingly, the spirals of the second layer and the following layers are not arranged irregularly and the coil thus formed can be easily moved toward the first flange to remove the coil from the coil form.

BRIEF DESCRIPTION OF THE DRAWINGS

The above and other objects, features and advantages of the present invention will become more apparent from the following description taken in connection with the accompanying drawings, in which:

FIG. 1 is a longitudinal sectional view of an essential portion of a coil winding jig in a preferred embodiment of the present invention;

FIG. 2 is a sectional view taken on line A—A in FIG. 1;

DETAILED DESCRIPTION OF THE PREFERRED EMBODIMENTS

Figure 4:
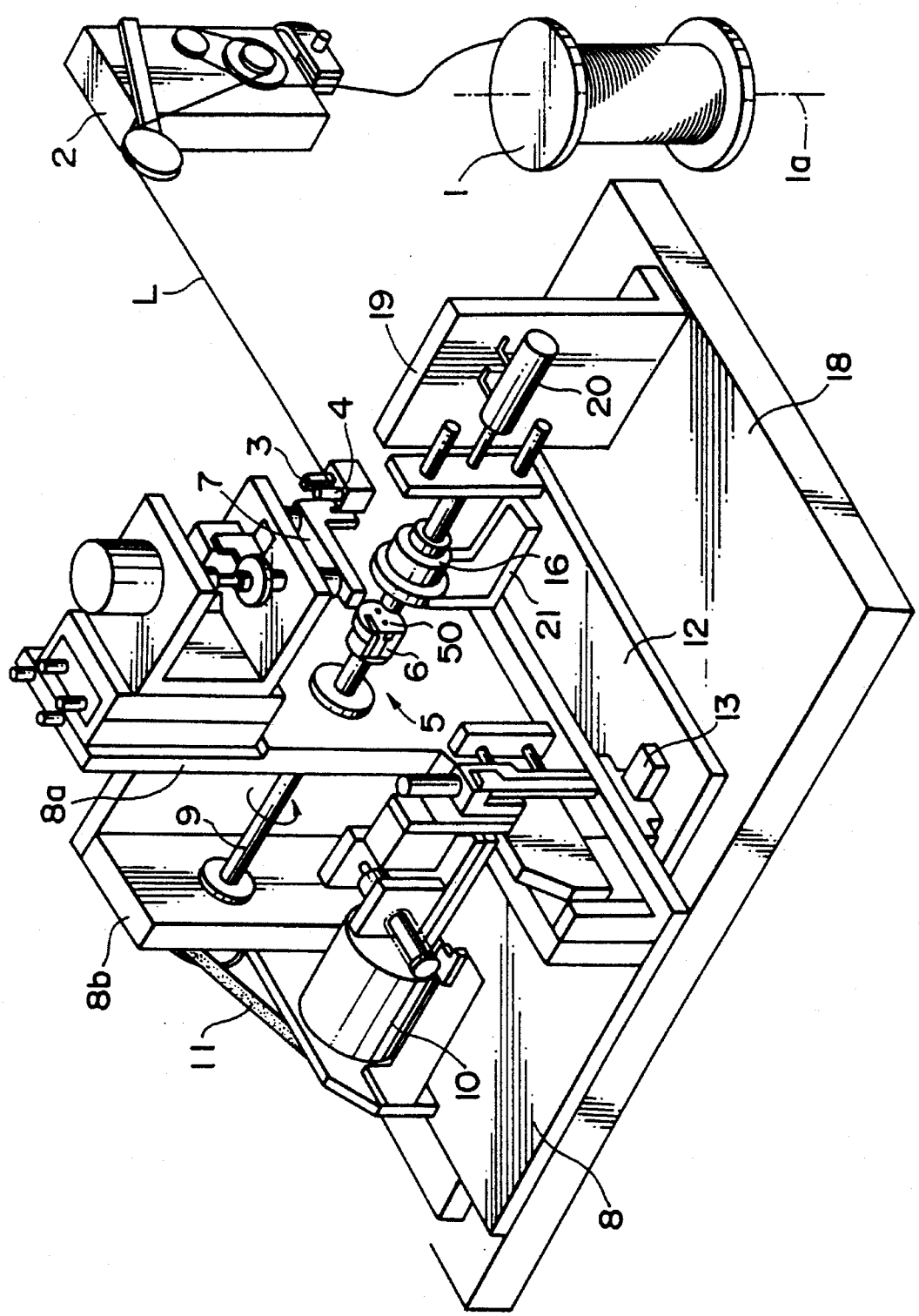
FIG. 4 is a perspective view of a coil winding machine provided with the coil winding jig of FIG. 1.

Referring to FIG. 4, a coil winding apparatus for forming a coil having a polygonal cross-section for a flat motor is shown. In this arrangement, an insulated wire L is wound on a bobbin 1 and the bobbin 1 is supported for rotation about an axis 1a. The wire L which is pulled off the bobbin 1 is extended through a tension control device 2 for imparting a fixed tensile force on the wire L. The arrangement further includes an alcohol applicator 3 and a traverse guide 4. The end of the wire L is fixedly held by a chuck 6 attached to the side surface of a first block 50 included in a winding jig 5. The alcohol applicator 3 applies alcohol to the wire L to make the spirals of the wire L wound in a coil C adhere to each other. A transfer chuck 7 is disposed between the traverse guide 4 and the chuck 6 to take the extremity of the wire L to the chuck 6.

The first block 50 of the coil winding jig 5 is fixed to the front end of a spindle 9 which is supported for rotation on the front support plate 8a and the back support plate 8b of a feed stand 8. A belt 11 extends between the rear end of the spindle 9 and a drive pulley and drive shaft (neither shown) of a motor 10 secured to the feed stand 8. The feed stand 8 can be moved forward and backward along a pair of rails 13 fixed to a base plate 12 by a driving source, not shown.

Figure 5:
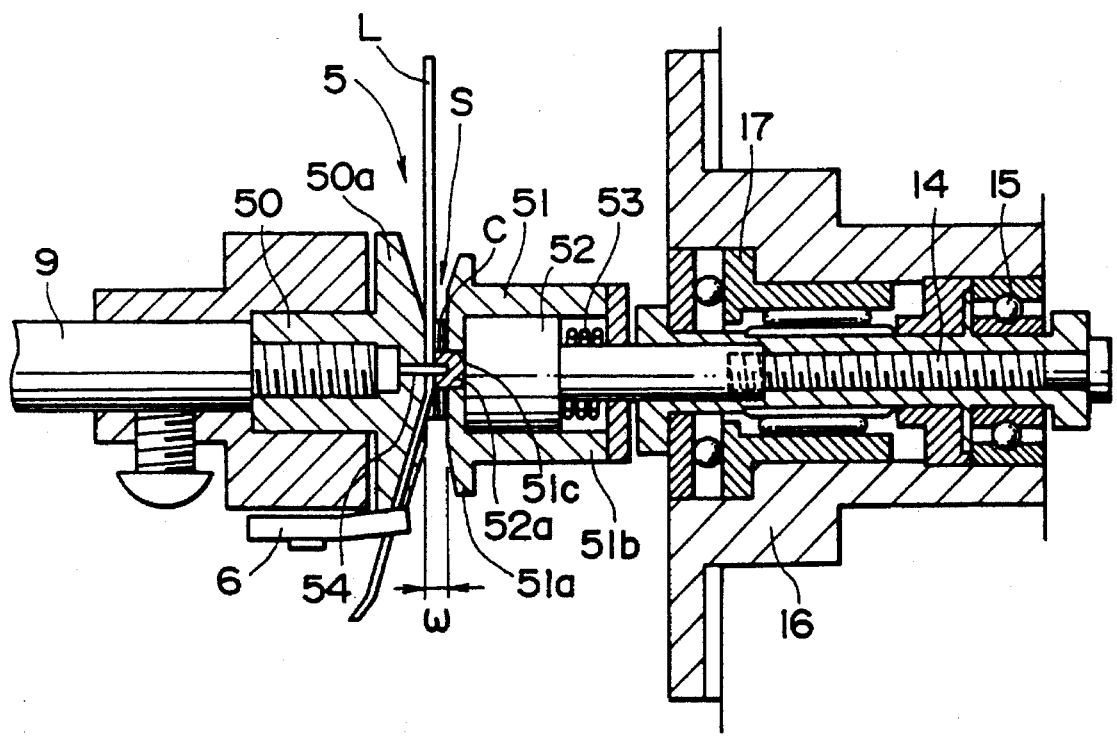
FIG. 5 is a fragmentary, longitudinal sectional view of the coil winding machine of FIG. 4, showing the coil winding jig of FIG. 1 and the associated parts.

As shown in FIG. 5, the coil winding jig 5 comprises, in addition to the first block 50, a second block 51, a third block 52, a compression spring 53 biasing the second block 51 toward the third block 52, and a flat pin 54, i.e., a torque transmitting means, for transmitting the rotation of the first block 50 to the third block 52. The first block 50, the second block 51 and the third block 52 are arranged coaxially. The first block 50 has a boss extending to the left, as viewed in FIG. 5, which is joined to the spindle 9, and a first flange 50a which is formed in its front portion. The second block 51 has a second flange 51a formed in its front portion opposite to the first flange 50a, and a boss 51b in its back portion. The third block 52 has a middle portion slidably fitted in a bore of the boss 51b, and a coil form 52a which projects toward the first flange 50a through a hole 51c formed in the second flange 51a. The compression spring 53 is compressed between the middle portion of the third block 52 and the back wall of the boss 51b within the boss 51b of the second block 51. The flat pin 54 projects from the center of the first flange 50a of the first block 50 toward the second flange 51a of the second block 51 so as to be fitted in a recess formed in the coil form 52a of the third block 52 to transmit the rotation of the first block 50 through the third block 52 to the second block 51.

Figure 6:
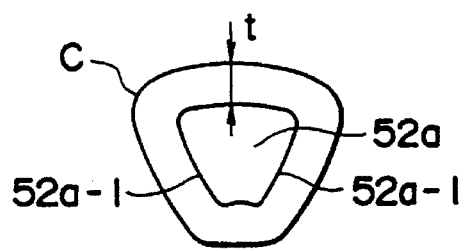
FIG. 6 is a sectional view of a coil formed on the coil form of the coil winding jig of FIG. 1.

As shown in FIG. 6, the coil form 52a of the third block 52 has a substantially trapezoidal cross-section, and the hole 51c of the second block 51 has a corresponding shape. Accordingly, the rotation of the third block 52 caused by the first block 50, causes the second block 51 to rotate. The flat central portion of the front surface of the first flange 50a of the first block 50, the outer surface of the coil form 52a of the third block 52 pressed against the first flange 50a, and the flat central portion of the front surface of the second flange 51a of the second block 51 facing the flat central portion of the front surface of the first flange 50a define a coil forming space S. The respective peripheral portions of the front surfaces of the first flange 50a and the second flange 51a surrounding the central flat portions of the same are tapered toward each other to facilitate the insertion of the wire L into the coil forming space S.

As shown in FIG. 5, the third block 52 has a shaft which extends backward, i.e., away from the coil form 52a, through the boss 51b of the second block 51 and which is supported coaxially with the spindle 9 in a support sleeve 14. As shown, the sleeve 14 is rotatably supported in a radial bearing 15, a needle bearing and a thrust bearing 17, all of which are fitted in a bearing housing 16. The bearing housing 16 is held fixedly on a bracket 19 fixed to a bed 18. A cylinder actuator 20 (shown in FIG. 4) is supported on the bracket 19. The cylinder actuator 20 urges the second block 51 of the coil winding jig 5 through an ejector 21 against the resilience of the compression spring 53 to push the coil C off the coil form 52a.

In operation, first the feed stand 8 is advanced, namely, moved toward the second block 51, to press the first flange 50a of the first block 50 mounted on the front end of the spindle 9 against the extremity of the coil form 52a of the third block 52 supported on the bearing housing 16 as shown in FIG. 5 to form the coil forming space S by the first block 50, the second block 51 and the third block 52 of the coil winding jig 5. In this state, the extremity or end of the flat pin 54 is fitted into the recess of the coil form 52a of the third block 52, so that the coil winding jig 5 can be driven for rotation by the spindle 9. Then, the free end of the wire L is transferred from the transfer chuck 7 to the chuck 6, and then the motor 10 is started to rotate the spindle 9 in the direction of the arrow (FIG. 4) through the belt 11. Consequently, the chuck 6 holding the free end of the wire L revolves together with the coil winding jig 5 to guide the wire L along the front surface of the first flange 50a of the first block 50 to the front end of the coil form 52a of the third block 52. Thus, the first spiral is formed around the front end of the coil form 52a, and then the second and the following spirals of the first layer are formed sequentially from the side of the first flange 50a toward the side of the second flange 51a. After the last spiral of the first layer has been formed, the wire L is caused to move toward the first flange 50a by the surface of the second flange 51a, so that spirals of the second layer are formed. After the last spiral of the second layer has been formed, the wire L is caused to move toward the second flange 51a by the surface of the first flange 50a, so that the spirals of the third layer are formed. Similarly, spirals of the fourth and the following layers are formed. Finally, a coil C having a thickness t and a width w as shown in FIG. 6 is formed on the coil form 52a. A tensile force is exerted by the tension device 2 on the wire L unwound from the bobbin 1 and an alcohol is applied to the wire L by the alcohol applicator. Therefore, the spirals of the wire L of the coil C adhere to each other.

Upon the completion of winding operation, the motor 10 is stopped, the wire L is cut at a position near the coil C, and then the feed stand 8 is retracted to separate the first flange 50a of the first block 50 from the coil form 52a of the third block 52. Then, the cylinder actuator 20 is actuated to move the second block 51 of the coil winding jig 5 against the resilience of the compression spring 53 toward the first flange 50a by the ejector 21 and, consequently, the coil C wound around the coil form 52a is pushed off the coil form 52a by the second flange 51a.

The coil winding jig 5 of the coil winding machine will be described in detail hereinafter with reference to FIGS. 1, 2 and 3(a) to 3(d).

Referring to FIGS. 1 and 2, a pair of substantially U-shaped guide members 55 are attached closely to the circumference of the coil form 52a of the third block 52 so as to extend around the hole 51c of the second block 51 and to form a step near the back end of the coil form 52a in the coil forming space S. The guide members 55 are extended along the opposite inclined side surfaces 51a-1 and around the edges at the opposite ends of the inclined side surfaces 51a-1 as shown in FIG. 2. Each guide member 55 has a rectangular cross-section and its height from the side surface of the coil form 52a is smaller than 3 √d/2 and its width, i.e., height from the surface of the second flange 51a, is smaller than d/2, where d is the diameter of the wire L. The coil form 52a of the third block 52 is tapered toward the first block 50, namely, the cross-section of the coil form 52a is reduced toward the first block 50, so that the circumference of the coil form 52a consists of inclined or tapered surfaces T inclined at an angle in the range of 1 to 2°.

Figure 3A:
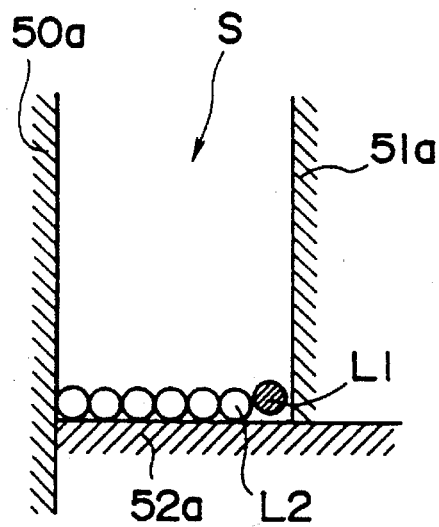
FIGS. 3(a) and 3(b) are schematic views of depicting a mode of forming layers of spirals of a wire using a conventional coil winding jig is used and FIGS. 3(c) and 3(d) are views of depicting a mode of forming layers of spirals of a wire when the coil winding jig shown in FIG. 1 is used.
Figure 3B:
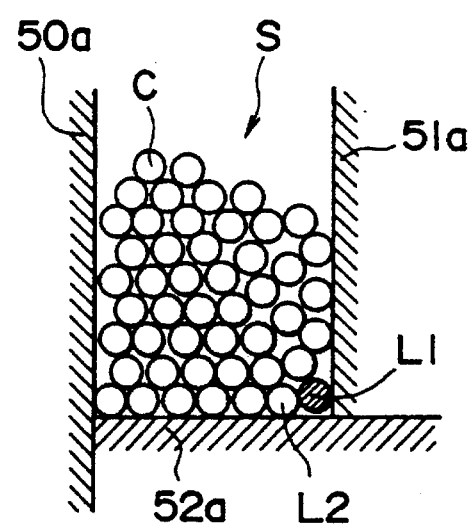

The function of the guide members 55 and the inclined side surfaces T of the coil form 52a of the third block 52 of the coil winding jig 5 will be described hereinafter with reference to FIGS. 3(a) to 3(d). The width of the coil forming space S between the first flange 50a and the second flange 51a is slightly greater than an integral multiple of the diameter of the wire L to facilitate winding the wire L around the coil form 52a. If the coil winding jig 5 is not provided with the guide members 55 and the wire L is wound around the coil form 52a from the side of the first flange 50a toward the second flange 51a to form the first layer, a portion $L_1$ of the wire L forming the first spiral of the second layer is forced to fall by half between the second flange 51a and a portion $L_2$ of the wire L forming the last spiral of the first layer as shown in FIG. 3(a). Consequently, the spirals of the second layer and the following layers are arranged irregularly and the coil C is formed in a random coil as shown in FIG. 3(b).

Figure 3C:
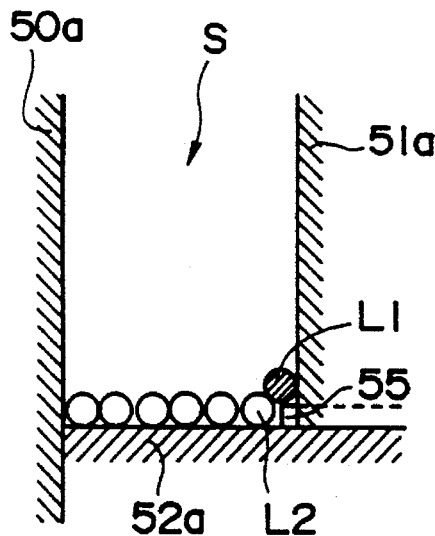
Figure 3D:
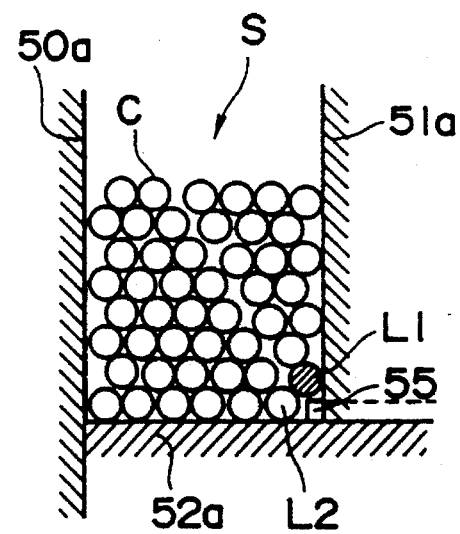

When the coil winding jig 5 is provided with the guide members 55 to form a small step on the coil form 52a contiguously with the second flange 51a in the coil winding space S, the portion $L_1$ of the wire L forming the first spiral of the second layer is wound on the guide members 55 as shown in FIG. 3(c) and will not be forced to fall between the second flange 51a and the portion $L_2$ of the wire L forming the last spiral of the first layer. Accordingly, the spirals of the second layer and the following layers are arranged regularly and the coil C is formed satisfactorily as shown in FIG. 3(d).

The function of the inclined side surfaces T of the coil form 52a will be described hereinafter. Since the coil form 52a is tapered toward the first flange 50a and the circumference of the coil form 52a consists of the inclined side surfaces T. Therefore, the spirals of the wire L of the first layer wound around the coil form 52a tend to move toward the first flange 50a. Therefore, the spirals of the wire L of the first layer on the coil form 52a are biased toward the first flange 50a and are formed contiguously at accurate pitches and hence the spirals of the wire L of the second layer and the following layers are formed regularly. Although the coil C is firmly bound on the coil form 52a because a fixed tension is provided in the wire L during winding operation, the coil C can be easily removed from the coil form 52a simply by moving the second block 51 relative to the third block 52 by a small force because the circumference of the coil form 52a consists of inclined side surfaces T.

As is apparent from the foregoing description, the combination of the coil winding jig and the coil winding machine, and the coil winding method in accordance with the present invention are capable of winding the wire in regularly arranged spirals for every layer of the coil, and of winding the coil so that the coil can be easily removed from the coil form.

Although the invention has been described in its preferred form and with a certain degree of particularity, many changes and variations are possible. It is therefore to be understood that the present invention may be practiced in forms other than those specifically described herein without departing from the scope and spirit of the invention.

What is claimed is:

1. A rotatable coil winding jig which can be rotated so that a wire under a fixed tension can be wound into a coil thereon, said coil winding jig comprising:

a first block having a first flange to which a free end of the wire is fixed;

a second block having a second flange, said second block being disposed opposite and coaxially with said first block with a front surface of the second flange facing a front surface of the first flange, said first and second flanges being spaced apart by a distance corresponding to the width of the coil to be formed;

a coil form;

a third block disposed coaxially with the second block, said third block having a middle portion which is rigid with said coil form, the middle portion being disposed within the second block, said coil form having side surfaces and a front end adapted to be pressed against the first flange, said coil form being arranged to extend from the middle portion of said third block through a hole formed in the second flange of said second block toward and into engagement with the first flange of said first block; and step means formed on said coil form for causing all of a first winding of wire which is wound on said coil form to be axially displaced toward the second flange by a predetermined amount selected to improve the regularity of the subsequent coil windings, said step means including steps which are formed on the side surfaces of said coil form and which extend contiguously with the front surface of the second flange.

2. A coil winding jig according to claim 1, wherein said coil form has a portion which is tapered toward the first flange, and the circumference of said coil form includes two inclined opposite side surfaces.

3. A coil winding jig according to claim 2, wherein said second block is axially movable relative to said third block.

4. A coil winding jig according to claim 2, wherein at least the two inclined opposite side surfaces are flat surfaces, and the angle formed between the extensions of the two opposite side surfaces is an acute angle.

5. A coil winding jig according to claim 1, wherein said coil form has a polygonal cross-section, and wherein the steps are formed so as to extend along two opposite inclined surfaces and around the opposite edges of the two opposite inclined side surfaces.

6. A coil winding machine comprising:

a rotatable coil winding jig for winding a wire under a fixed tension, into a coil, said coil winding jig including:

a first block having a first flange to which the free end of the wire is fixed, a second block having a second flange, said second block being disposed opposite to and coaxially with said first block so that a front surface of the second flange faces a front surface of the first flange, the first and second flanges being spaced apart a distance corresponding to the width of the coil to be formed, a coil form; and a third block disposed coaxially with said second block, said third block having a middle portion which is disposed within a hollow portion of said second block, and which is integral with said coil form, said coil form having a front end which is adapted to be pressed against the first flange by being projected through a hole in the second flange of said second block into engagement with the first flange;

a driving source for selectively moving said first block toward and away from said second block;

torque transmitting means for transmitting torque from said first block through said coil form to said second block; and tensioning means for maintaining the wire under a predetermined fixed tension while the wire is being fed to said coil form;

small step means formed on side surfaces of said coil form so as to extend contiguously with the front surface of the second flange, for causing all of a first winding of wire which is wound on said coil form, to be axially displaced toward the second flange by a predetermined amount selected to improve the regularity of the subsequently formed coil windings.

7. A coil winding machine according to claim 6, wherein said coil form has a portion which is tapered toward the first flange of the first block, and the circumference of said coil form consists two of inclined opposite side surfaces.

8. A coil winding machine according to claim 7, wherein said second block having the second flange is axially movable relative to said third block.

9. A coil winding machine according to claim 7, wherein the coil form has a polygonal cross-section, and wherein the steps extend along the two opposite inclined side surfaces and around the opposite edges of the two opposite inclined side surfaces.

10. A coil winding machine according to claim 7, wherein the two inclined opposite side surfaces are flat surfaces, and the angle formed between the extensions of the two inclined side surfaces is an acute angle.

11. A coil winding method employing a coil winding jig comprising a first block having a first flange, a second block having a second flange and disposed opposite to and coaxially with the first block, and a third block having a coil form coaxially extending between the first and second flanges and provided with small steps of a size smaller than the diameter of the wire, said coil winding method comprising the steps of:

winding a wire around the coil form from the first flange toward the second flange so that spirals of the wire are formed contiguously in first layer;

using the small steps to displace a first a first spiral of the first layer toward the second block by a predetermined amount selected to improve the regularity of the subsequently formed coil winding; and winding a first spiral of the wire of a second layer on top of the steps of the coil form.

12. A coil winding method according to claim 11, wherein the coil form has a portion which is tapered toward the first flange and wherein the coil formed on the coil form is moved toward the second flange when it is removed from the coil form.

* * * * *